United States Patent Office 3,394,987
Patented July 30, 1968

3,394,987
REACTING CALCIUM CARBONATE AND WET PROCESS PHOSPHORIC ACID
Donald E. Lee, Atlanta, Ga., and Ernest Csendes, Palisades, Calif., assignors to Armour and Company, Chicago, Ill., a corporation of Delaware
No Drawing. Filed Aug. 4, 1964, Ser. No. 387,497
4 Claims. (Cl. 23—109)

ABSTRACT OF THE DISCLOSURE

A solid calcium polyphosphate product is prepared by reacting wet process phosphoric acid with calcium carbonate at a relatively low $CaO/P_2O_5$ mole ratio, preferably in the range of 0.20/1.00. The calcium polyphosphate reaction product is heated at a temperature in excess of room temperature and up to 1000° C. (preferably 400–800° C.) until the product is solid and more than 50 percent and preferably more than 80 percent of the $P_2O_5$ content is water soluble.

---

This invention relates to water-soluble calcium polyphosphates and to the preparation of the product.

An object of the invention is to prepare a calcium polyphosphate product which is solid, having a relatively high $P_2O_5$ value, with a large portion of the $P_2O_5$ being water soluble. A further object is to provide a process for the preparation of water-soluble calcium phosphate products through the selective heat treatment of calcium polyphosphate. Other specific objects and advantages will appear as the specification proceeds.

In one embodiment of our process, wet process phosphoric acid, which may be orthophosphoric acid, polyphosphoric acid, or mixtures thereof, is reacted with calcium carbonate at a relatively low $CaO/P_2O_5$ mole ratio, the ratio being substantially less than 1.00 and preferably in the neighborhood of 0.25 or 0.20. The calcium polyphosphate reaction product is then heated for a short period, preferably for more than 10 minutes and less than 3 hours, at a temperature in excess of room temperature and up to 1000° C., the preferred range being 400° to 800° C. Excellent results have been obtained in the range of 450° to 700° C. Preferably, the heating is continued until more than 50 percent and preferably more than 80 percent of the $P_2O_5$ content is water soluble.

The acid starting material may be any wet process phosphoric acid. We can use the ordinary wet process phosphoric acid of commerce. Such an acid may have a $P_2O_5$ range of 27 to 67 weight percent. However, we find that superphosphoric acid is also satisfactory, and such acid may have a $P_2O_5$ content of 68 to 74 weight percent.

Any suitable apparatus may be employed since the use of equipment for carrying on the reactions and for heating the calcium polyphosphate is not critical. The reaction between the calcium carbonate and the phosphoric acid may be carried out at ambient temperatures, and the resulting dark brown liquid may then be placed in muffle furnaces or any other suitable heating equipment and heated until the product has a water solubility above 50 percent and preferably above 80 percent. As above stated, the preferable temperature range is 400° to 800° C., and it is found that the heating time is less than 3 hours, and that the higher temperatures may be less than 30 minutes and preferably more than 10 minutes. By maintaining a mole ratio of $CaO/P_2O_5$ substantially below 1.0 and preferably below 0.50, we are able to obtain an extremely high percentage of water-soluble material. Best results have been obtained when the mole ratio of $CaO/P_2O_5=0.25$.

Specific examples illustrative of the process may be set out as follows:

Example I

Wet process orthophosphoric acid having a total $P_2O_5$ of 55 percent (ortho 53.9 percent) was reacted with calcium carbonate at ambient temperatures in the proportion of 456.8 gms. of orthophosphoric acid and 43.2 gms. of calcium carbonate. Forty-gram samples of the dark brown liquid (mole ratio—$CaO/P_2O_5=0.25$) were placed in muffle furnaces maintained at 200, 450, 700 and 1000° C. for 30, 60 and 120 minutes. After the specified residence time, the samples were removed, allowed to cool, and analyzed, with the following results:

| Temp. | Time | Percent $P_2O_5$ | | | Percent Water Soluble of Total | Percent Fluorine |
|---|---|---|---|---|---|---|
| | | Total | Insol. | Water Soluble | | |
| Room | 0 | 56.3 | 0.2 | 55.2 | 98.1 | 0.29 |
| 450° C | 30 | 75.5 | 0.7 | 75.2 | 99.6 | 0.05 |
| 450° C | 60 | 76.8 | 1.6 | 74.4 | 96.9 | 0.18 |
| 450° C | 120 | 76.8 | 8.5 | 67.6 | 88.0 | 0.07 |
| 700° C | 30 | 81.9 | 4.2 | 77.4 | 94.5 | 0.04 |
| 700° C | 60 | 81.8 | 3.2 | 40.7 | 49.7 | 0.04 |
| 700° C | 120 | 80.7 | 10.2 | 6.3 | 7.7 | 0.07 |

The water solubility and other analytical data were determined in accordance with standard A.O.A.C. methods.

Example II

The process was carried out as set out in Example I employing as a starting material superphosphoric acid having 68 percent $P_2O_5$. A similar test was made using superphosphoric acid having 75 percent $P_2O_5$. Tests were also made with furnace phosphoric acid of high purity, but this did not under the above-described conditions give products of comparable solubility.

While in the foregoing specification, we have set out specific embodiments of the invention in considerable detail for the purpose of illustrating the invention, it will be understood that such detail or details may be varied widely by those skilled in the art without departing from the spirit and scope of our invention.

We claim:
1. In a process for preparing water-soluble calcium polyphosphate in solid form, the steps of reacting calcium carbonate and wet process phosphoric acid selected from the group consisting of orthophosphoric acid, polyphosphoric acid, and mixtures thereof, the mole ratio of the $CaO/P_2O_5$ being in the range of about 0.20–0.50 and heating the reaction product at a temperature in the range of about 400–800° C. until at least 70 percent of the $P_2O_5$ content is water soluble and the product is a solid.

2. The process of claim 1 in which the mole ratio of the $CaO/P_2O_5$ is about 0.25.

3. The process of claim 1 in which the product has a $P_2O_5$ content in excess of 80 percent and at least 80 percent of the $P_2O_5$ content is water soluble.

4. The reaction product of calcium carbonate and wet process phosphoric acid in which the $CaO/P_2O_5$ ratio is about 0.20–0.50, the product having a $P_2O_5$ content in excess of 80 percent and being a solid with at least 80 percent of the $P_2O_5$ content thereof being water soluble.

References Cited

UNITED STATES PATENTS 2,889,217  6/1959  LeBaron _____ 71—47
3,316,061  4/1967  Csendes et al. _____ 23—165

OTHER REFERENCES

Van Wazer, "Phosphorus And Its Compounds" vol. 1, Chemistry, Interscience Publishers, Inc., 1958, pp. 510 and 511.

OSCAR R. VERTIZ, *Primary Examiner.*

L. A. MARSH, *Assistant Examiner.*